United States Patent [19]
Heo

[11] Patent Number: 5,985,174
[45] Date of Patent: Nov. 16, 1999

[54] FLUORESCENT MATERIAL USED IN AN ACTIVE DYNAMIC LIQUID CRYSTAL DISPLAY DEVICE AND METHOD FOR MANUFACTURING THE SAME

[75] Inventor: Kyeong-Jae Heo, Anyang-shi, Rep. of Korea

[73] Assignee: Samsung Display Devices, Rep. of Korea

[21] Appl. No.: 09/092,887

[22] Filed: Jun. 8, 1998

[30] Foreign Application Priority Data

Sep. 22, 1997 [KR] Rep. of Korea .................. 97-48097
Apr. 9, 1998 [KR] Rep. of Korea .................. 98-12540

[51] Int. Cl.$^6$ ................. C09K 11/62; C09K 11/56; C09K 11/55; C09K 11/64
[52] U.S. Cl. ..................... 252/301.4 R; 252/301.45
[58] Field of Search ............... 252/301.4 R, 301.4 S

[56] References Cited

U.S. PATENT DOCUMENTS

| | | | |
|---|---|---|---|
| 3,623,996 | 11/1971 | Amster | 252/301.4 S |
| 3,639,254 | 2/1972 | Peters | 252/301.4 S |
| 4,216,408 | 8/1980 | Verstegen et al. | 252/301.4 R |
| 4,249,108 | 2/1981 | Wolfe | 313/486 |
| 4,733,126 | 3/1988 | Yamakawa et al. | 313/487 |
| 5,350,971 | 9/1994 | Jeong | 313/487 |

FOREIGN PATENT DOCUMENTS 53-61964 6/1978 Japan .............. 252/301.4 S

*Primary Examiner*—C. M. Koslow
*Attorney, Agent, or Firm*—Baker & McKenzie

[57] ABSTRACT

According to the present invention, there are provided a green fluorescent material of the general formula:

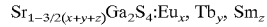

where, $0.01 \leq x \leq 0.2$; $0.0001 \leq y \leq 0.007$; and $0.0001 \leq z \leq 0.002$, and a blue fluorescent material of the general formula:

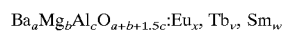

where, $0.1 \leq a \leq 2.4$; $0.1 \leq b \leq 5$; $8 \leq c \leq 64$; $0.01 \leq x \leq 0.2$; $0.00005 \leq v \leq 0.002$; and $0.00001 \leq w \leq 0.001$.

A fluorescent material of the present invention enhances the luminous efficiency of the active dynamic liquid display device.

11 Claims, 3 Drawing Sheets

FLUORESCENT MATERIAL USED IN AN ACTIVE DYNAMIC LIQUID CRYSTAL DISPLAY DEVICE AND METHOD FOR MANUFACTURING THE SAME

BACKGROUND OF THE INVENTION

1. Field of the Invention

The present invention relates to a fluorescent material, and more particularly, to a fluorescent material used in an active dynamic liquid crystal display device and a method for manufacturing the same.

2. Description of the Prior Art

Generally, in an active dynamic liquid crystal display device, a light emitted from a back light is directed to a liquid crystal layer through a polarizer. The light directed to the liquid crystal layer is transmitted to a fluorescent material or interrupted in accordance with orientations of the liquid crystal molecules. The light transmitted to the fluorescent material excites the material to display an image.

As described above, since the active dynamic liquid crystal display device is designed such that the light emitted from the back light directly excites the fluorescent material, there is a need for a fluorescent material with high luminance.

In general, $SrGa_2S_4$:Eu which is excited by violet light having a wavelength of about 380 to about 420 nm has been used as a green fluorescent material, and $BaMgAl_{10}O_{17}$:Eu has been used as a blue fluorescent material.

However, the light emission luminance of these materials are not enough to apply to the active dynamic liquid crystal display device.

Therefore, U.S. Pat. Nos. 4,249,108 and 4,733,126 have proposed a method for improving the luminous efficiency by changing composition of the fluorescent material or adding another material to the fluorescent material, and U.S. Pat. No. 5,350,971 has proposed a method for improving the luminous efficiency by adjusting a diameter of each grains of the fluorescent material.

However, the fluorescent materials proposed by the above patents are not still enough in light emission luminance.

In addition, to increase the luminous efficiency, there has been proposed $SrGa_2S_4$:Eu,Tb and $BaMgAl_{10}O_{17}$:Eu,Tb. These materials are not also still enough in luminance.

As is well known, the active dynamic liquid display device requires a fluorescent material which is excited in a dark blue color range. The luminous efficiency of $SrGa_2S_4$:Eu and $BaMgAl_{10}O_{17}$:Eu is determined by transmission efficiency of light emission energy to Eu. Tb is used to transmit the light emission energy to Eu.

SUMMARY OF THE INVENTION

Therefore, there is a need for providing a fluorescent material which can enhance the luminous efficiency of the active dynamic liquid display device.

It is an object of the present invention to provide a green fluorescent material having a general formula $$Sr_{1-3/2(x+y+z)}Ga_2S_4:Eu_x, Tb_y, Sm_z$$

where, $0.0 \leq x \leq 0.2$; $0.0001 \leq y \leq 0.007$; and $0.0001 \leq z \leq 0.002$.

Preferably, z is 0.001~0.002 and $Sr_{1-3/2(x+y+z)}Ga_2S_4:Eu_x$, $Tb_y$, $Sm_z$ is $Sr_{0.96}Ga_2S_4:Eu_{0.02}$, $Tb_{0.0005}$, $Sm_{0.002}$.

It is another object of the present invention to provide a blue fluorescent material having a general formula $$Ba_aMg_bAl_cO_{a+b+1.5c}:Eu_x, Tb_v, Sm_w$$

where, $0.1 \leq a \leq 2.4$; $0.1 \leq b \leq 5$; $8 \leq c \leq 64$; $0.01 \leq x \leq 0.2$; $0.00005 \leq v \leq 0.002$; and $0.00001 \leq w \leq 0.001$.

Preferably, w is 0.0001~0.001, and $Ba_aMg_bAl_cO_{a+b+1.5c}:Eu_x$, $Tb_y$, $Sm_z$ is $BaMgAl_{10}O_{17}:Eu_{0.02}$, $Tb_{0.001}$, $Sm_{0.001}$.

It is still another object of the present invention to provide a method for producing a green fluorescent material comprising the steps of:

preparing a first compound comprising of strontium salt, gallium salt, europium oxide, terbium salt, and sodium halide as a solvent;

preparing a second compound by adding $Sm_2O_3$ to the first compound; and calculating the second compound at a temperature of about 700–900° C. for about 1 to about 4 hours, thereby obtaining a green fluorescent material of $Sr_{1-3/2(x+y+z)}Ga_2S_4:Eu_x$, $Tb_y$, $Sm_z$ where, $0.01 \leq x \leq 0.2$; $0.0001 \leq y \leq 0.007$; and $0.0001 \leq z \leq 0.002$.

The method further comprises the steps of cooling, crushing, drying, and powdering the calculated material.

The calculating step is conducted in a hydrogen sulfide gas atmosphere.

It is still another object of the present invention to provide a method for producing a blue fluorescent material comprising the steps of:

preparing a first compound comprising of barium salt, magnesium salt, alumina, europium oxide, terbium salt, and sodium halide as a solvent preparing a second compound by adding $Sm_2O_3$ to the first compound; and calcining the second compound at a temperature of about 1200 to about 1500° C. for about 1 to about 4 hours, thereby obtaining a blue fluorescent material of $Ba_aMg_bAl_cO_{a+b+1.5c}:Eu_x$, $Tb_y$, $Sm_w$ where, $0.1 \leq a \leq 2.4$; $0.1 \leq b \leq 5$; $8 \leq c \leq 64$; $0.01 \leq x \leq 0.2$; $0.00005 \leq v \leq 0.002$; and $0.00001 \leq w \leq 0.001$.

The calcining step is conducted in $N_2$–5% $H_2$ gas atmosphere.

BRIEF DESCRIPTION OF THE DRAWINGS

The foregoing and other objects and advantages of the present invention will be better understood from the following detailed description when in conjunction with the attached drawings, in which.

DETAILED DESCRIPTION OF THE INVENTION

FIRST EXAMPLE

Figure 1:
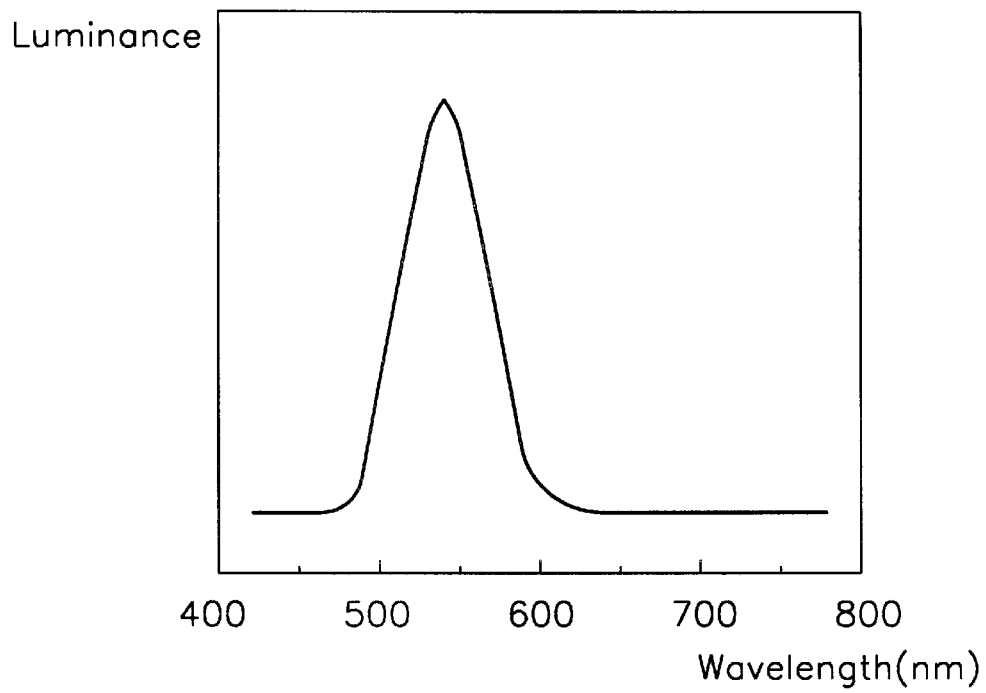
FIG. 1 is a graph illustrating light emission spectrums of green fluorescent materials obtained by the present invention.

A first compound was prepared by mixing strontium carbonate of 0.96 mole, gallium oxide 1 mole, europium oxide 0.01 mole, and terbium oxide of 0.0025 mole with sodium bromide of 1 wt %.

Then, $Sm_2O_3$ having Sm of 0.001 mole with respect to the host material was added to the first compound, thereby obtaining a second compound.

The second compound was calcined at a temperature of about 800° C. for two hours in a hydrogen sulfide gas atmosphere.

Finally, the calcined material went through a cooling, crushing, drying, powdering processes, thereby obtaining a green fluorescent material of the present invention having the formula: $Sr_{0.96}Ga_2S_4:Eu_{0.02}$, $Tb_{0.005}$, $Sm_{0.002}$.

The europium is reduced from trivalent to bivalent in hydrogen sulfide gas, thereby obtaining a luminous quality. The hydrogen sulfide gas provides an atmosphere that allows alkaline earth metal to mix with gallium metal. The powdering was realized using a screen sieving process.

SECOND EXAMPLE

A first compound was prepared by mixing strontium carbonate of 0.96 mole, gallium sulfate 1 mole, europium oxide 0.01 mole, and terbium nitrate of 0.0025 mole with sodium bromide of 1 wt %.

Then, $Sm_2O_3$ having Sm of 0.001 mole with respect to the host material was added to the first compound, thereby obtaining a second compound.

The second compound was calcined at a temperature of about 800° C. for two hours in a hydrogen sulfide gas atmosphere.

Finally, the calcined material went through a cooling, crushing, drying, powdering processes, thereby obtaining a green fluorescent material of the present invention.

The powdering process was conducted as in example 1.

THIRD EXAMPLE

A first compound was prepared by mixing strontium carbonate of 0.96 mole, gallium oxide 1 mole, europium oxide 0.01 mole, and terbium oxide of 0.0025 mole with sodium bromide of 1 wt %.

Then, $Sm_2O_3$ having Sm of 0.002 mole with respect to the host material was added to the first compound, thereby obtaining a second compound.

The second compound was calcined at a temperature of about 800° C. for two hours in a hydrogen sulfide gas atmosphere.

Finally, the calcined material went through a cooling, crushing, drying, powdering processes, thereby obtaining a green fluorescent material of the present invention.

The powdering process was conducted as in example 1.

Comparative Example 1

A first compound was prepared by mixing strontium carbonate of 0.96 mole, gallium oxide 1 mole, europium oxide 0.01 mole, and terbium oxide 0.00025 mole with sodium bromide of 1 wt %.

The first compound was calcined at a temperature of about 800° C. for two hours in a hydrogen sulfide gas atmosphere.

Finally, the calcined material went through a cooling, crushing, drying, powdering processes, thereby obtaining a prior green fluorescent material.

The powdering process was conducted as in example 1.

Comparative Example 2

A first compound was the prepared by mixing strontium sulfate of 0.96 mole, gallium sulfate 1 mole, europium oxide 0.01 mole, and terbium nitrate of 0.0025 mole with sodium bromide of 1 wt %.

Then, $Sm_2O_3$ having Sm of 0.005 mole with respect to the host material was added to the first compound, thereby obtaining a second compound.

The second compound was calcined at a temperature of about 800° C. for two hours in a hydrogen sulfide gas atmosphere.

Finally, the calcined material went through a cooling, crushing, drying, powdering processes, thereby obtaining a green fluorescent material.

The powdering process was conducted as in example 1.

Comparative Example 3

A first compound was prepared by mixing strontium carbonate of 0.96 mole, gallium oxide 1 mole, europium oxide 0.01 mole, and terbium carbonate of 0.0025 mole with the sodium bromide of 1 wt %.

Then, $Sm_2O_3$ having Sm of 0.01 mole with respect to the host material was added to the first compound, thereby obtaining a second compound.

The second compound was calcined at a temperature of about 800° C. for two hours in a hydrogen sulfide gas atmosphere.

Finally, the calcined material went through a cooling, crushing, drying, powdering processes, thereby obtaining a green fluorescent material.

The powdering process was conducted as in example 1.

FIG. 1 shows a graph illustrating light emission spectrums of green fluorescent materials obtained by examples 1 to 3. As shown in the graph, the resultant fluorescent materials of the present invention have a relatively high light emission luminance of 550 nm.

Figure 2:
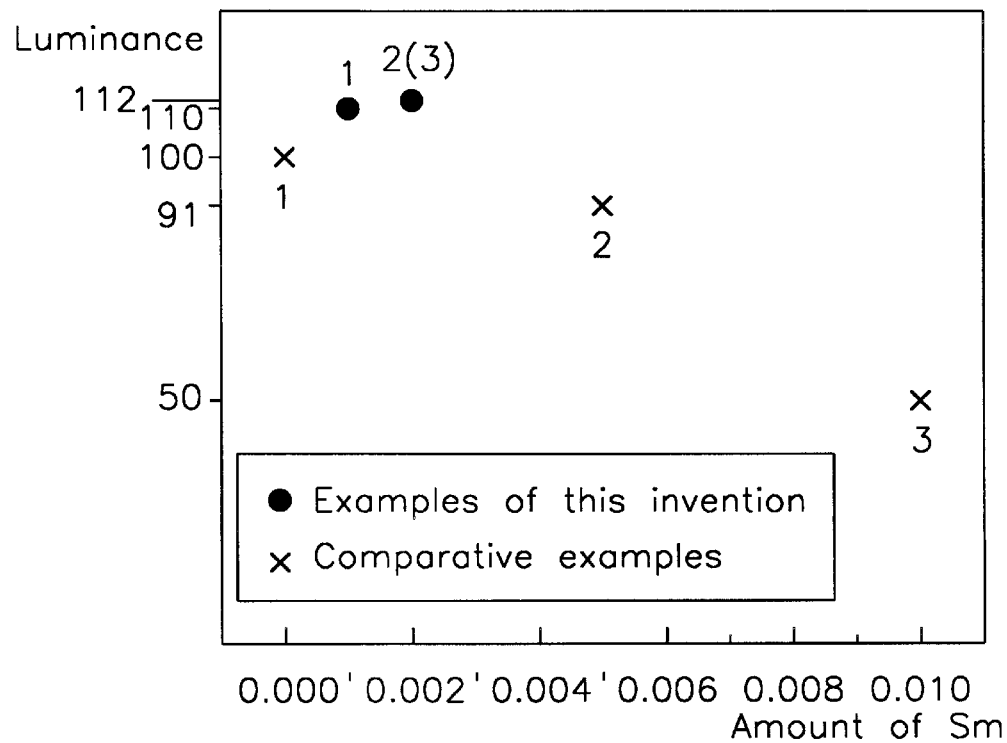
FIG. 2 is a graph illustrating relative light emission luminance against amount of Sm of green fluorescent materials obtained by the present examples and comparative examples.

FIG. 2 shows a graph illustrating relative light emission luminance measured when back light having a 394 nm was emitted to the fluorescent materials obtained by examples 1 to 3 and comparative examples 1 to 3.

The measurement of light emission luminance was conducted using MSR 7000 (Products of Opto Research Co.,).

When assuming that the light emission luminance of the fluorescent material obtained by comparative example 1 is "100", the light emission luminance of the fluorescent materials obtained by examples 1, 2 and 3 and comparative examples 2 and 3 are shown in the following table 1.

TABLE 1

|  | Comp. Ex. 1 | Comp. Ex. 2 | Comp. Ex. 3 | Ex. 1 | Ex. 2 | Ex. 3 |
| --- | --- | --- | --- | --- | --- | --- |
| Amount of Sm | 0 mole | 0.005 mole | 0.01 mole | 0.001 mole | 0.001 mole | 0.002 mole |
| Relative Luminance | 100 | 91 | 50 | 110 | 112 | 112 |

As shown in Table 1, when Sm of about 0.001 to about 0.002 mole was added, the luminous efficiency by light of about 380 to about 420 nm was greatly improved.

With regard to strontium salt, gallium salt, europium oxide, terbium salt, any materials equivalent to these materials do not affect luminous efficiency. Although the calcination process was conducted for 2 hours, it may be adjusted within a range from 1 to 4 hours.

EXAMPLE 4

A first compound was prepared by mixing barium carbonate of 1 mole, magnesium carbonate of 1 mole, alumina of 8 mole, europium oxide 0.01 mole, and terbium oxide of 0.00025 mole with sodium fluoride of 0.3 mole.

Then, $Sm_2O_3$ having Sm of 0.0001 mole with respect to the host material was added to the first compound.

The second compound was calcined at a temperature of about 1500° C. for two hours in $N_2$–5% $H_2$ gas atmosphere.

Finally, the calcined material went through a cooling, crushing, drying, powdering processes, thereby obtaining a blue fluorescent material of the present invention having the formula: $BaMgAl_{10}O_{17}:Eu_{0.02}, Tb_{0.001}, Sm_{0.001}$.

$N_2$–5% $H_2$ gas makes the europium be reduced from trivalent to bivalent so that the europium can have a luminous quality.

The powdering was realized using a screen sieving process.

EXAMPLE 5

A first compound was prepared by mixing barium sulfate of 1 mole, magnesium sulfate of 1 mole, alumina of 8 mole, europium oxide of 0.01 mole, and terbium carbonate of 0.00025 mole with sodium chloride of 0.3 mole.

Then, $Sm_2O_3$ having Sm of 0.0005 mole with respect to the host material was added to the first compound.

The second compound was calcined at a temperature of about 1500° C. for two hours in $N_2$–5% $H_2$ gas atmosphere.

Finally, the calcined material went through a cooling, crushing, drying, powdering processes, thereby obtaining a blue fluorescent material of the present invention.

$N_2$–5% $H_2$ gas makes the europium be reduced from trivalent to bivalent so that the europium can have a luminous quality.

The powdering was realized using a screen sieving process.

EXAMPLE 6

A first compound was prepared by mixing barium carbonate of 1 mole, magnesium sulfate of 1 mole, alumina of 8 mole, europium oxide 0.01 mole, and terbium oxide of 0.00025 mole with sodium fluoride of 0.3 mole.

Then, $Sm_2O_3$ having Sm of 0.001 mole with respect to the host material was added to the first compound.

The second compound was calcined at a temperature of about 1500° C. for two hours in $N_2$–5% $H_2$ gas atmosphere.

Finally, the calcined material went through a cooling, crushing, drying, powdering processes, thereby obtaining a blue fluorescent material of the present invention.

$N_2$–5% $H_2$ gas makes the europium be reduced from trivalent to bivalent so that the europium can have a luminous quality.

The powdering was realized using a screen sieving process.

Comparative Example 4

A first compound was prepared by mixing barium carbonate of 1 mole, magnesium carbonate of 1 mole, alumina of 8 mole, europium oxide 0.01 mole, and terbium oxide of 0.00025 mole with the aluminum fluoride of 0.3 mole.

Then, $Sm_2O_3$ having Sm of 0.002 mole with respect to the host material was added to the first compound.

The second compound was calcined at a temperature of about 1500° C. for two hours in $N_2$–5% $H_2$ gas atmosphere.

Finally, the calcined material went through a cooling, crushing, drying, powdering processes, thereby obtaining a blue fluorescent material.

The powdering process was realized using a screen sieving process.

Comparative Example 5

A first compound was prepared by mixing barium carbonate of 1 mole, magnesium sulfate of 1 mole, alumina of 8 mole, europium oxide 0.01 mole, and terbium oxide of 0.00025 mole with ammonium chloride of 0.3 mole.

The first compound was calcined at a temperature of about 1500° C. for two hours in $N_2$–5% $H_2$ gas atmosphere.

Finally, the calcined material went through a cooling, crushing, drying, powdering processes, thereby obtaining a prior blue fluorescent material.

$N_2$–5% $H_2$ gas makes the europium be reduced from trivalent to bivalent so that the europium can have a luminous quality.

The powdering process was realized using a screen sieving process.

Figure 3:
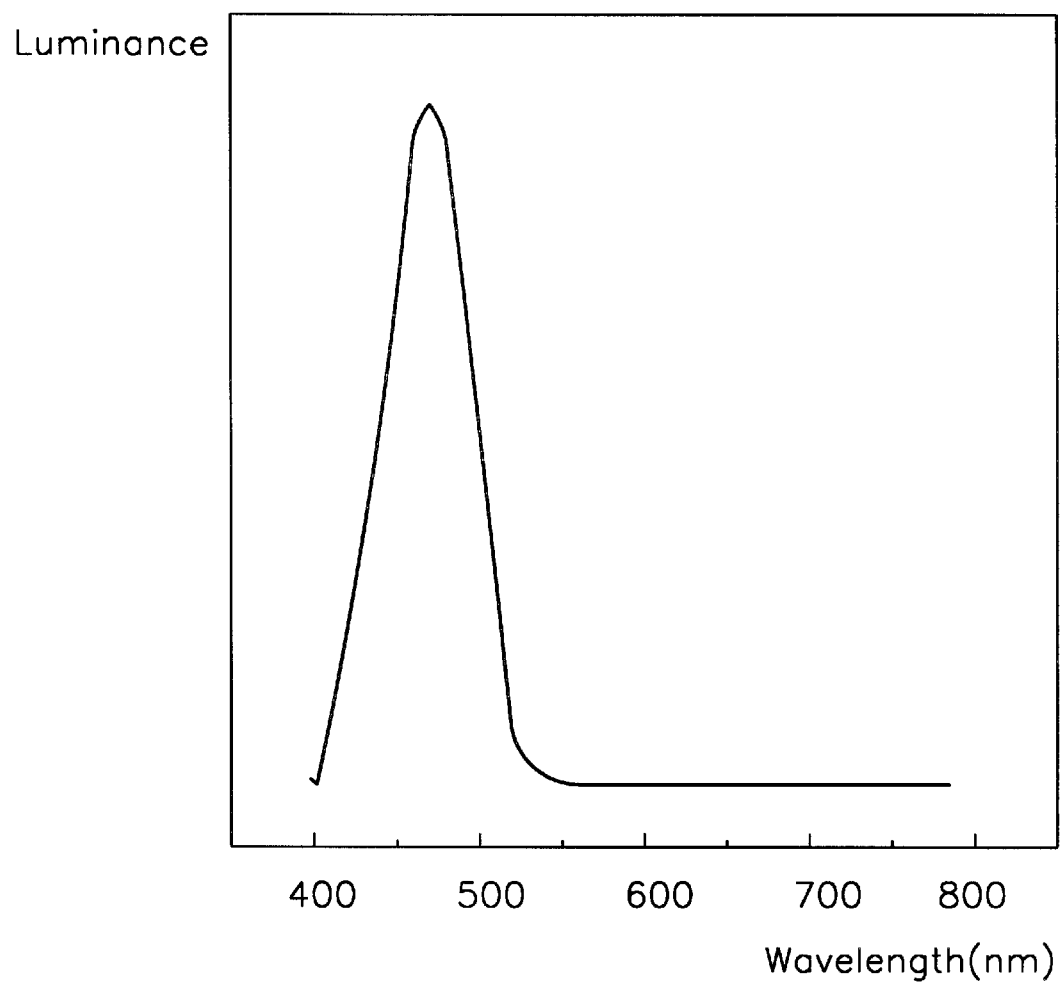
FIG. 3 is a graph illustrating light emission spectrums of blue fluorescent materials obtained by the present invention.

FIG. 3 shows a graph illustrating light emission spectrums of blue fluorescent materials obtained by examples 4 to 6. As shown in the graph, the resultant fluorescent materials of the present invention have a relatively high light emission luminance of 470 nm.

Figure 4:
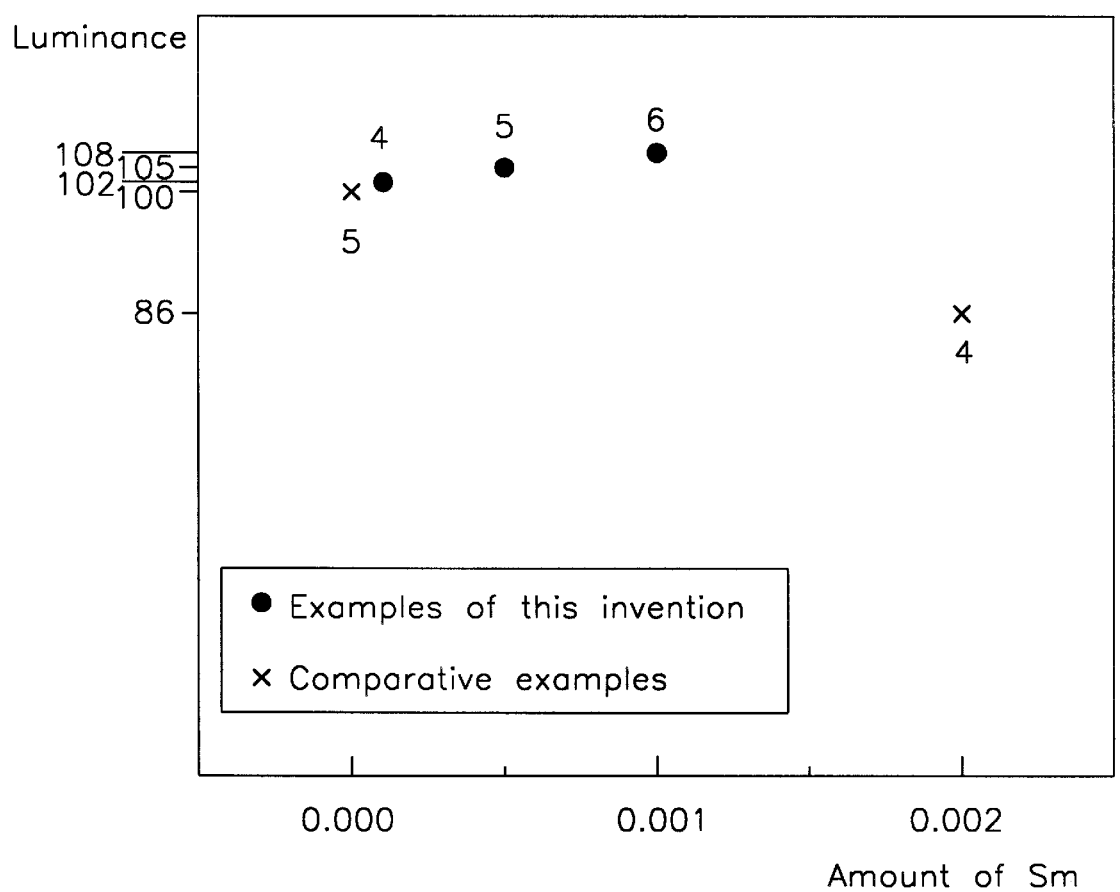
FIG. 4 is a graph illustrating relative light emission luminance against amount of Sm of blue fluorescent materials obtained by the present examples and comparative examples.

FIG. 4 shows a graph illustrating relative light emission luminance measured when back light having a 394 nm was emitted to the fluorescent materials obtained by examples 4 to 6 and comparative examples 4 and 5.

The measurement of light emission luminance was conducted using MSR 7000 (Products of Opto Research Co.,).

When assuming that the light emission luminance of the fluorescent material obtained by comparative example 5 is "100", the light emission luminance of the fluorescent materials obtained by examples 4, 5 and 6 and comparative examples 4 are shown in the following table 2.

TABLE 2

|  | Comp. Ex. 5 | Comp. Ex. 4 | Ex. 4 | Ex. 5 | Ex. 6 |
| --- | --- | --- | --- | --- | --- |
| Amount of Sm | 0 mole | 0.002 mole | 0.0001 mole | 0.0005 mole | 0.001 mole |
| Relative Luminance | 100 | 86 | 102 | 105 | 108 |

As shown in Table 2, when Sm of about 0.0001 to about 0.0001 mole was added, the light emission luminance effect was greatly improved.

Particularly, when adding 0.001 mole, the light emission luminance effect was highest.

With regard to barium salt, magnesium salt, europium oxide, terbium salt, any materials equivalent to these materials do not affect quality of luminance. Although the calcination process was conducted for 2 hours, it may be adjusted within a range from 1 to 4 hours.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A green fluorescent material of the general formula: $Sr_{1-3/2(x+y+z)}Ga_2S_4:Eu_x, Tb_y, Sm_z$ where, $0.01 \leq x \leq 0.2$; $0.0001 \leq y \leq 0.007$; and $0.0001 \leq z \leq 0.002$.

2. A green fluorescent material of claim 1, wherein $Sr_{1-3/2(x+y+z)}Ga_2S_4:Eu_x, Tb_y, Sm_z$ is $Sr_{0.96}Ga_2S_4:Eu_{0.02}, Tb_{0.005}, Sm_{0.002}$.

3. A blue fluorescent material of the general formula: $Ba_aMg_bAl_cO_{a+b+1.5c}:Eu_x, Tb_y, Sm_w$ where, $0.1 \leq a \leq 2.4$; $0.1 \leq b \leq 5$; $8 \leq c \leq 64$; $0.01 \leq x \leq 0.2$; $0.00005 \leq v \leq 0.002$; and $0.00001 \leq w \leq 0.001$.

4. A blue fluorescent material of claim 3, wherein $Ba_aMg_bAl_cO_{a+b+1.5c}:Eu_x, Tb_y, Sm_w$ is $BaMgAl_{10}O_{17}:Eu_{0.02}, Tb_{0.001}, Sm_{0.001}$.

5. A method for producing a green fluorescent material comprising the steps of:

preparing a first compound comprising strontium salt, gallium salt, europium oxide, terbium salt and sodium halide as a solvent;

preparing a second compound by adding $Sm_2O_3$ to the first compound;

calcining the second compound at a temperature of about 700 to about 900° C. for about 1 to about 4 hours, thereby obtaining a green fluorescent material of $Sr_{1-3/2(x+y+z)}Ga_2S_4:Eu_x, Tb_y, Sm_z$, wherein, $0.01 \leq x \leq 0.2$, $0.0001 \leq y \leq 0.007$, and $0.0001 \leq z \leq 0.002$; and wherein the calcining step is conducted in a hydrogen sulfide gas atmosphere.

6. A method of claim 5 further comprising the steps of cooling, crushing, drying, and powdering the calcined material.

7. A method of claim 5, wherein the $Sm_2O_3$ consists of Sm of about 0.001~0.002 mole.

8. A method for producing a green fluorescent material of claim 5, wherein $Sr_{1-3/2(x+y+z)}Ga_2S_4:Eu_x, Tb_y, Sm_z$ is $Sr_{0.96}Ga_2S_4:Eu_{0.02}, Tb_{0.005}, Sm_{0.002}$.

9. A method for producing a blue fluorescent material comprising the steps of:

preparing a first compound comprising barium salt, magnesium salt, alumina, europium oxide, terbium salt, and sodium halide as a solvent;

preparing a second compound by adding $Sm_2O_3$ to the first compound;

calcining the second compound at a temperature of about 1200 to about 1500° C. for about 1 to about 4 hours, thereby obtaining a blue fluorescent material of $Ba_aMg_bAl_cO_{a+b+1.5c}:Eu_x, Tb_y, Sm_w$, wherein, $1 \leq a \leq 2.4$, $0.1 \leq b \leq 5$, $8 \leq c \leq 64$, $0.01 \leq x \leq 0.2$, $0.00005 \leq v \leq 0.002$, and $0.00001 \leq w \leq 0.001$; and wherein the calcining step is conducted in $N_2$–5% $H_2$ gas atmosphere.

10. A method of claim 7, wherein $Ba_aMg_bAl_cO_{a+b+1.5c}:Eu_x, Tb_y, Sm_w$ is $BaMgAl_{10}O_{17}:Eu_{0.02}, Tb_{0.001}, Sm_{0.001}$.

11. A method of claim 9, wherein the $Sm_2O_3$ consists of Sm of about 0.0001 to about 0.001 mole.

* * * * *